United States Patent
Stewart et al.

[11] Patent Number: 6,158,892
[45] Date of Patent: Dec. 12, 2000

[54] FLUID FILM THRUST BEARING HAVING INTEGRAL COMPLIANT FOILS

[75] Inventors: Matthew J. Stewart, Moorpark; Dennis H. Weissert, Simi Valley, both of Calif.; Theodore S. Brockett, Gilbert, Ariz.

[73] Assignee: Capstone Turbine Corporation, Chatsworth, Calif.

[21] Appl. No.: 09/383,067

[22] Filed: Aug. 25, 1999

[51] Int. Cl.⁷ ..................................................... F16C 32/06
[52] U.S. Cl. ............................................................ 384/105
[58] Field of Search .................................... 384/103, 104, 384/105, 106

[56] References Cited

U.S. PATENT DOCUMENTS

| | | | |
|---|---|---|---|
| 4,247,155 | 1/1981 | Fortmann | 384/124 |
| 4,624,583 | 11/1986 | Saville et al. | 384/105 |
| 4,682,900 | 7/1987 | Gu | 384/105 |
| 4,776,077 | 10/1988 | Gu | 29/173 |
| 4,871,267 | 10/1989 | Gu | 384/105 |
| 5,248,205 | 9/1993 | Gu et al. | 384/106 |
| 5,918,985 | 7/1999 | Bosley | 384/105 |

*Primary Examiner*—Thomas R. Hannon
*Attorney, Agent, or Firm*—Albert J. Miller

[57] ABSTRACT

A compliant foil fluid film bearing having individual fluid film foils formed as arcuate segments by an inner circumferential slot, an outer circumferential slot and a transverse therebetween. The transverse slot may be radial, slightly displaced from radial or tapered with one radial edge.

18 Claims, 6 Drawing Sheets

FLUID FILM THRUST BEARING HAVING INTEGRAL COMPLIANT FOILS

TECHNICAL FIELD

This invention relates to the general field of compliant foil fluid film bearings and more particularly to an improved fluid film thrust bearing having integral compliant foils.

BACKGROUND OF THE INVENTION

Compliant foil fluid film thrust bearings are currently being utilized in a variety of high speed rotor applications. These bearings are generally comprised of a two sided thrust disk rotating element, non-rotating compliant fluid foil members that axially enclose the rotating element, non-rotating compliant spring foil members that axially enclose the fluid foil members and a non-rotating thrust plate element and a non-rotating housing element that axially enclose and provide attachments for the foil members. The space between the rotating element and the thrust plate element on one side of the bearing and the space between the rotating element and the thrust surface of the housing element on the other side of the bearing are filled with fluid (usually air) which envelops the foils.

The rotary motion of the rotating element applies viscous drag forces to the fluid and induces circumferential flow of the fluid between the smooth surface of the rotating element and the fluid foil. The space between the rotating element and the fluid foil is subdivided into a plurality of fluid-dynamic wedge channels. The leading ramps of the foil pads relative to the fluid's circumferential flow and the smooth surface of the rotating element form the two primary surfaces of the converging wedge channels. The trailing ramps and the smooth surface of the rotating element form the primary surfaces of the diverging wedge channels.

The fluid flowing circumferentially along a converging wedge channel experiences steadily decreasing flow area, increasing circumferential flow velocity and increasing static fluid pressure. If the rotating element moves toward the non-rotating element, the convergence angle of the wedge channel increases causing the fluid pressure rise along the channel to increase. If the rotating element moves away, the pressure rise along the wedge channel decreases. Thus, the fluid in the wedge channels exerts restoring forces on the rotating element that vary with and stabilize running clearances and prevents contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in bearing wear. It is only when the rotor speed is above what is termed the lift-off/touch-down speed that the fluid dynamic forces generated in the wedge channels assure a running gap between the rotating and non-rotating elements.

Conventional compliant foil fluid film thrust bearings operate with extremely small running clearances and moderate as opposed to low drag and power consumption. The clearances between the non-rotating fluid foil's converging channel ramp trailing ends and the rotating thrust disk are typically less than 100 micro-inches when the bearing is heavily loaded at operating conditions.

Compliant foil fluid film thrust bearings tend to rely on backing or undersprings to preload the fluid foils against the relatively moveable rotating element (thrust disk) so as to control foil position/nesting and to establish foil dynamic stability. The bearing starting torque (which should ideally be zero) is directly proportional to these preload forces. These preload forces also significantly increase the disk speed at which the hydrodynamic effects in the wedge channels are strong enough to lift the rotating element of the bearing out of physical contact with the non-rotating members of the bearing. These preload forces and the high lift-off/touch-down speeds result in significant bearing wear each time the disk is started or stopped.

It has been common for compliant foil fluid film thrust bearings to utilize a plurality of coated, convex curved, compliant fluid foils or pads that are welded to a support foil to form the fluid foil member of the bearing such as illustrated in U.S. Pat. No. 4,682,900 issued Jul. 28, 1987 entitled "Thrust Bearing Underspring". These multiple piece fluid foil members are typically thicker and have poorer thickness control than can single piece fluid foil members. Two piece fluid foil members also experience process fluid flow turbulence, increased drag at operating speeds and reduced load capacity owing to the flow discontinuities between the trailing edges of each foil pad and the weld attachment edge of the next circumferentially located pad.

There have been instances, however, where the fluid foil member is integrally formed to provide a plurality of alternating converging and diverging surfaces. Examples of this are described in U.S. Pat. No. 4,247,155 issued Jan. 27, 1981 entitled "Resilient Foil Bearings", U.S. Pat. No. 4,624,583 issued Nov. 25, 1986 entitled "Foil Thrust Bearing", and U.S. Pat. No. 4,871,267 issued Oct. 3, 1989 entitled "Foil Thrust Bearing".

SUMMARY OF THE INVENTION

In the present invention, the compliant foil fluid film thrust bearing generally comprises a single sided or two sided thrust disk rotor, an integrally formed fluid foil member, and an underspring. The non-rotating but compliant fluid foils are located adjacent to the thrust face or faces of the rotatable disk. The individual fluid foils are each an arcuate segment formed by an outer circumferential slot, an inner circumferential slot, and a transverse slot. The transverse slot may be radial, slightly off from radial, or tapered with one radial edge.

BRIEF DESCRIPTION OF THE DRAWINGS

Figure 1:
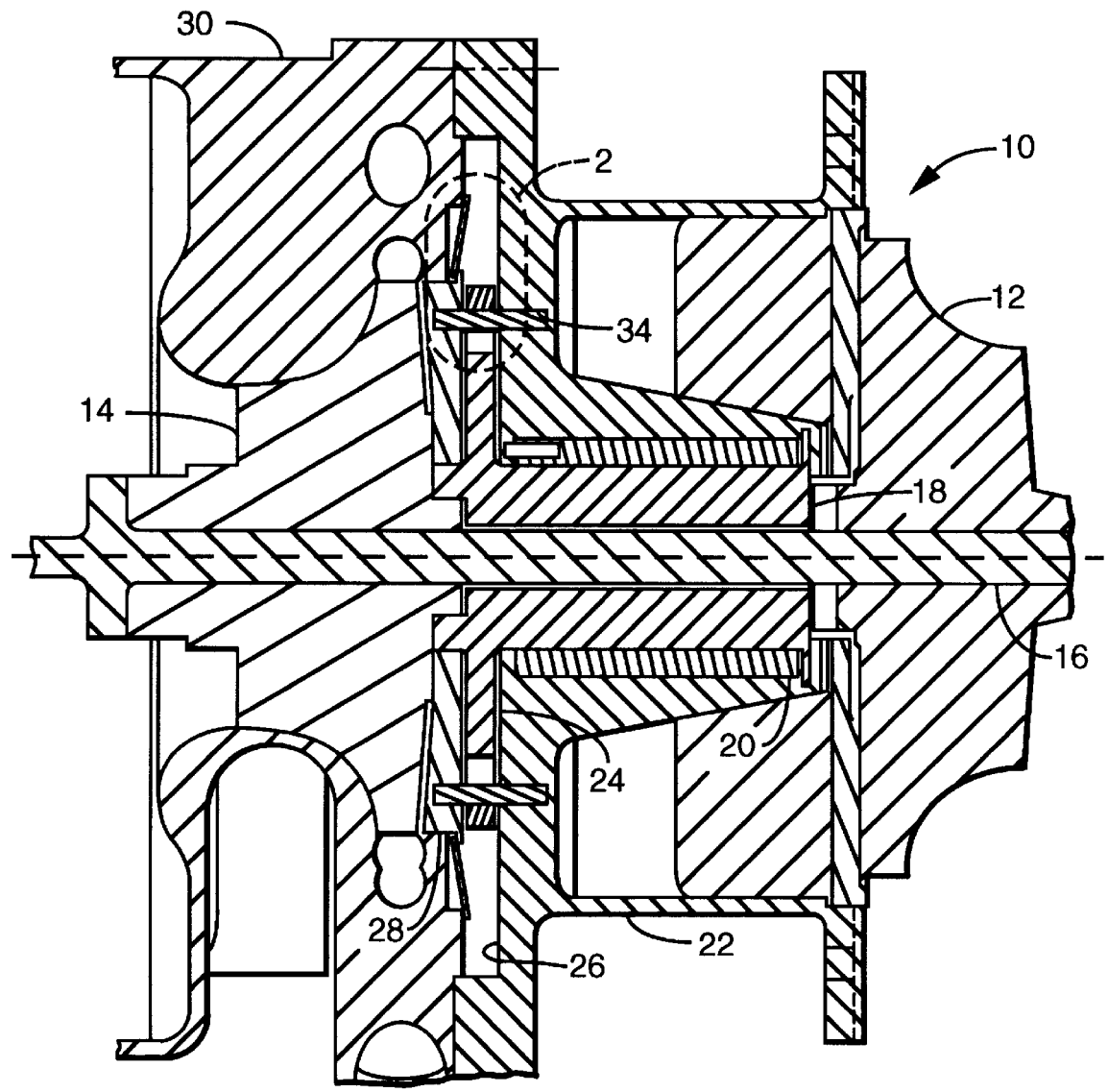
Figure 2:
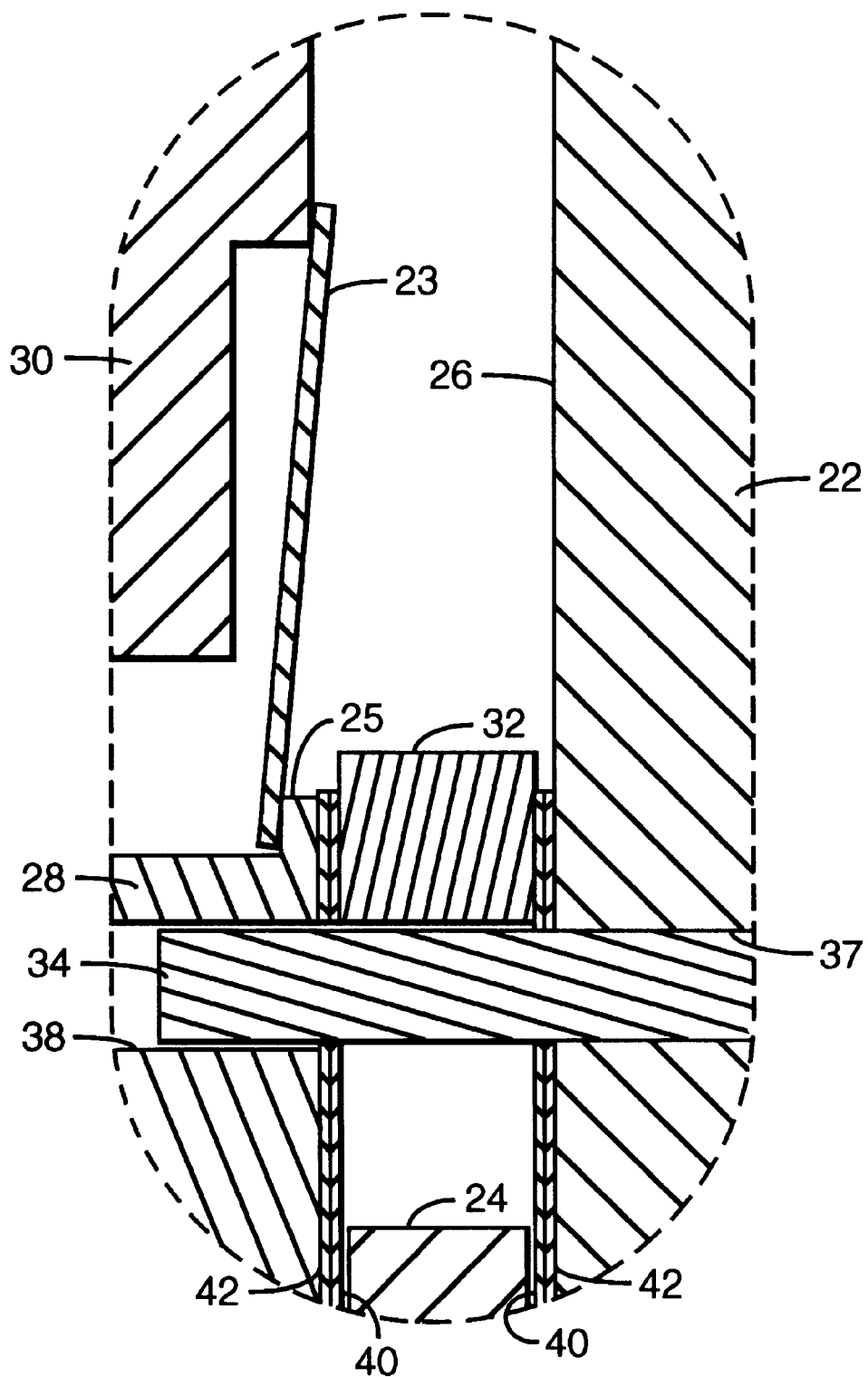
Figure 3:
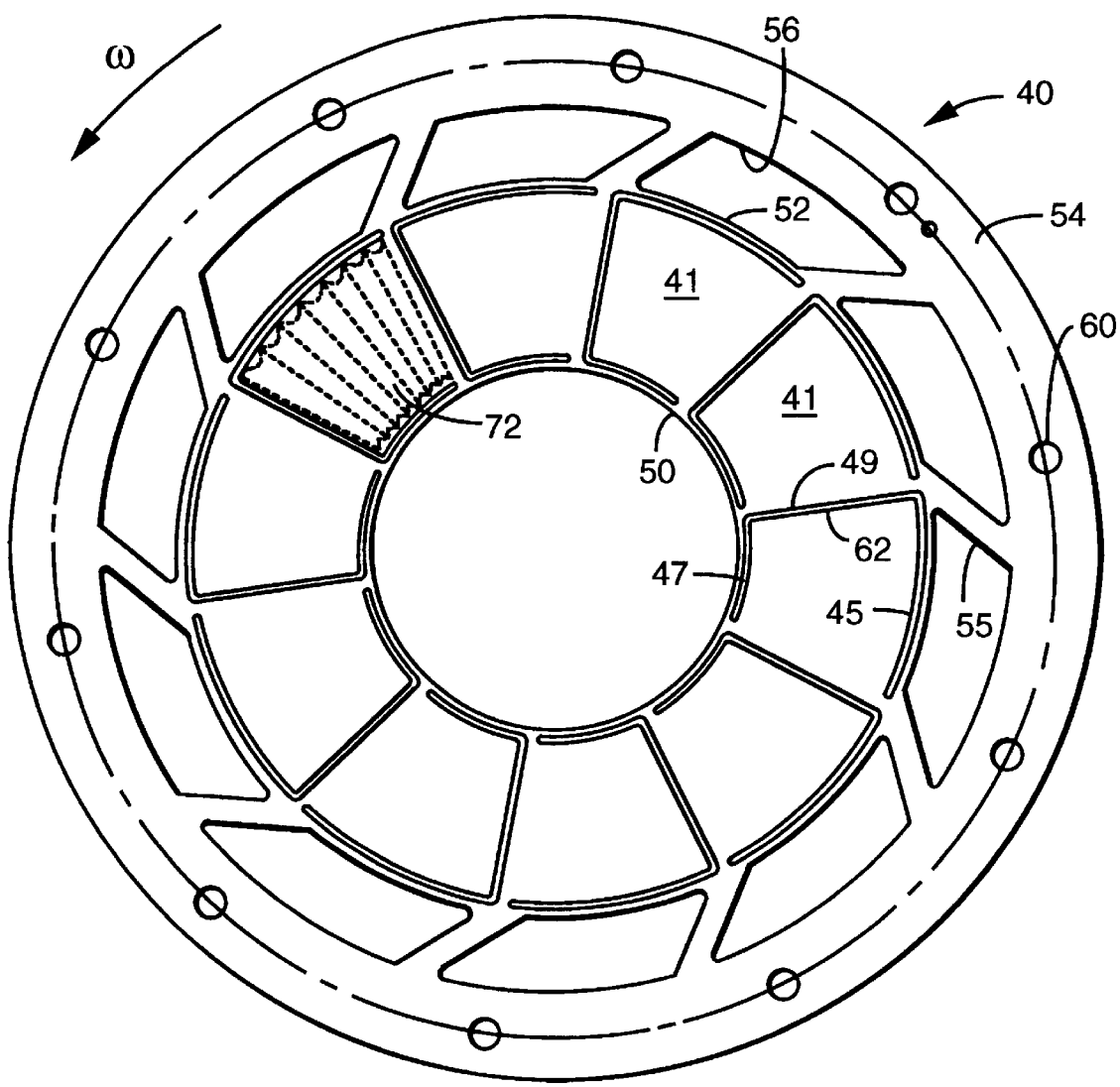
Figure 4:
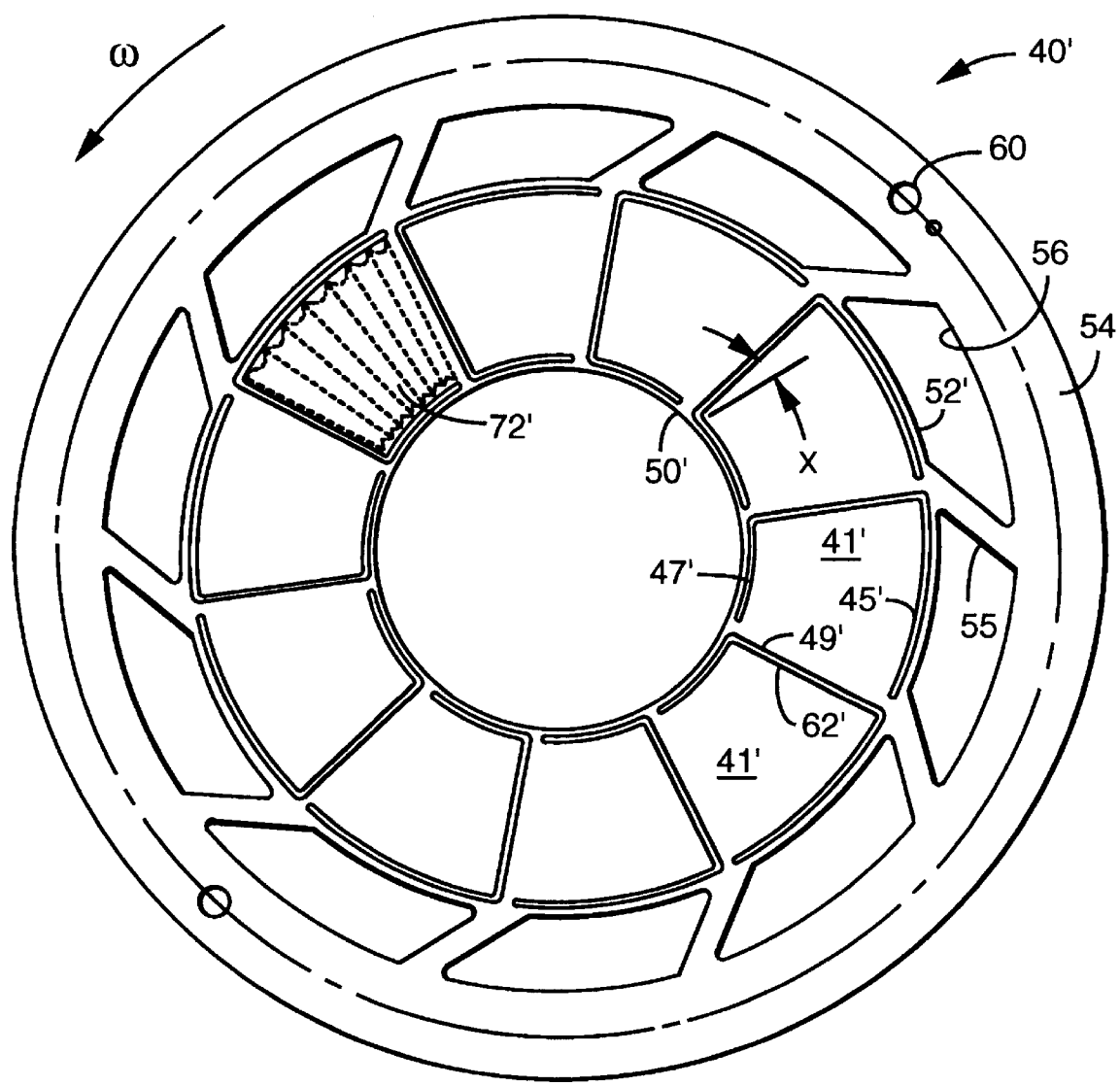
Figure 5:
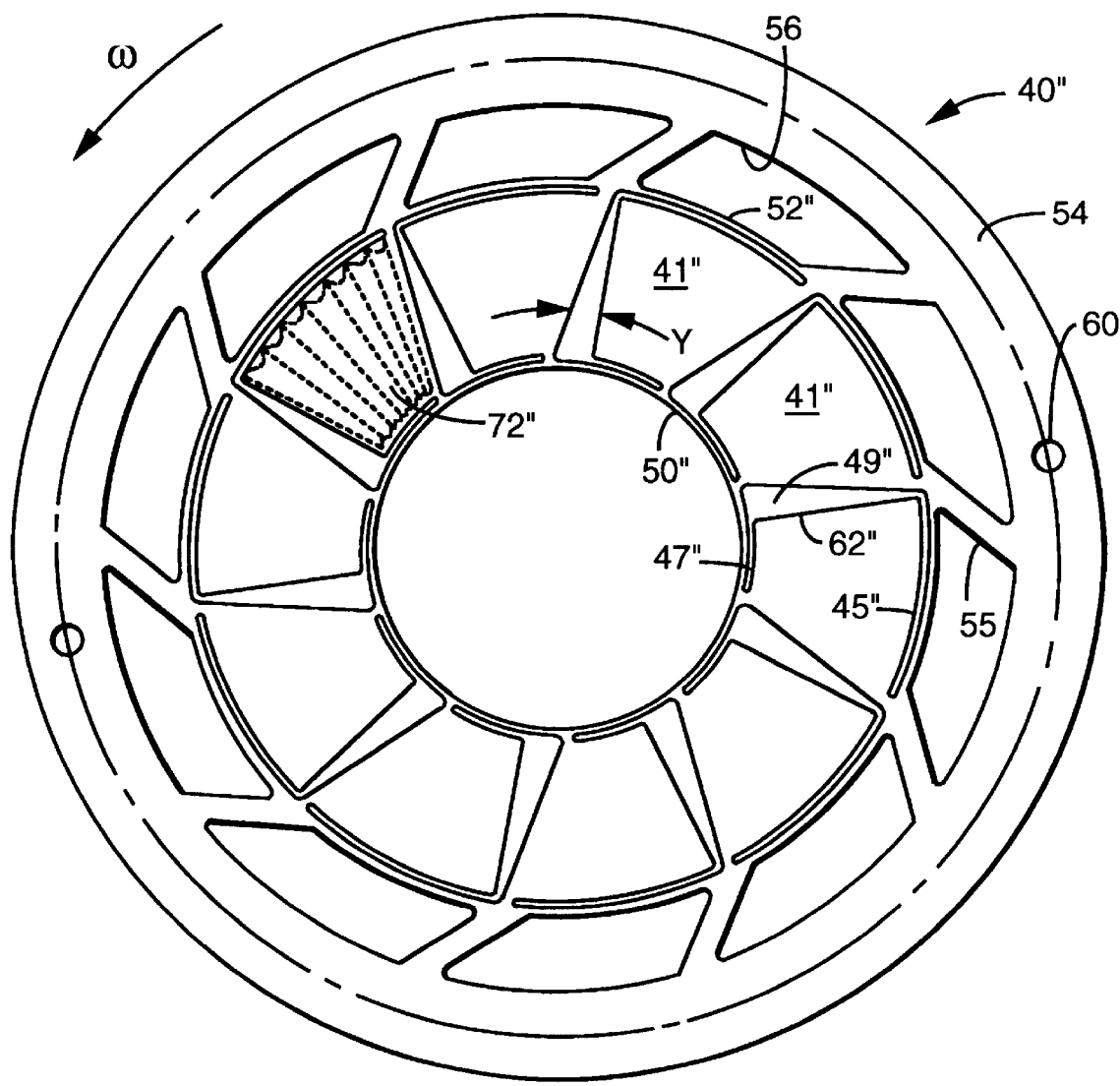
Figure 6:
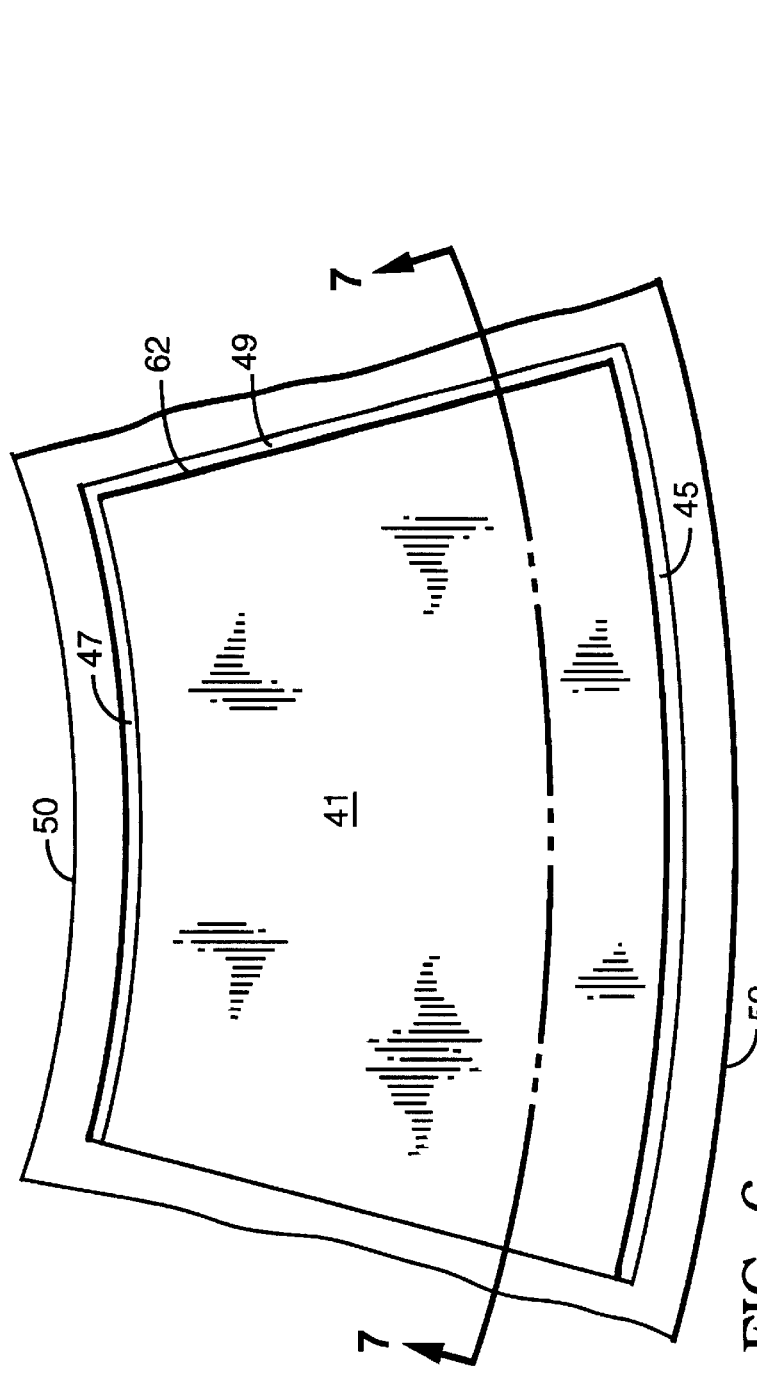
Figure 7:
Figure 8:

Having thus described the present invention in general terms, reference will now be made to the accompanying drawings in which:

FIG. 1 is a sectional view of a turbomachine having the fluid film thrust bearing of the present invention;

FIG. 2 is an enlarged partial view of oval 2 of FIG. 1 illustrating the thrust plate and spacer area of the fluid film thrust bearing of the present invention;

FIG. 3 is a plan view of the integrally formed compliant foil member of the present invention;

FIG. 4 is a plan view of an alternate integrally formed compliant foil member of the present invention;

FIG. 5 is a plan view of another alternate integrally formed compliant foil member of the present invention;

FIG. 6 is an enlarged plan view of a single integrally formed compliant foil and underspring;

FIG. 7 is a sectional view of the integrally formed compliant foil member and underspring of the present invention taken along line 7—7 of FIG. 6; and FIG. 8 is an end view of the integrally formed compliant foil and underspring of FIG. 6.

DETAILED DESCRIPTION OF THE PREFERRED EMBODIMENTS

A turbomachine utilizing the fluid film thrust bearing of the present invention is illustrated in FIG. 1. The turbomachine 10 generally includes turbine wheel 12 and compressor wheel 14 at opposite ends of a common shaft or tie bar 16. The thrust and radial bearing rotor 18 is disposed around the tie bar 16 between the turbine wheel 12 and the compressor wheel 14. A journal bearing cartridge 20 in center bearing housing 22 rotatably supports the bearing rotor 18.

The compressor end of the bearing rotor 18 includes a radially extending thrust disk 24 which extends into a recess 26 in the compressor end of the center bearing housing 22. A bearing thrust plate 28 is disposed on the opposite side of the bearing rotor thrust disk 24. The outer periphery of the compressor end of the center bearing housing 22 engages the compressor housing 30.

As best illustrated in FIG. 2, a thrust bearing spacer 32 is positioned radially outward from the thrust disk 24 of the bearing rotor 18 and is positioned radially by a plurality of circumferentially spaced pins 34 which are fixed in holes 37 in the recess 26 of the center bearing housing 22 and extend into holes 38 in the thrust bearing plate 28. Alternately, pilots could be utilized to align the various elements. A thrust bearing fluid foil member 40 and thrust bearing spring foil member 42 are disposed on either side of the bearing rotor thrust disk 24 and thrust bearing spacer 32. On one side, the fluid foil member 40 and spring foil member 42 are positioned in the recess 26 of the center bearing housing 22 and on the other side they are adjacent to the bearing thrust plate 28. The fluid foil member 40 and spring foil member 42 are held in position radially and circumferentially by the pins 34 which extend from the center bearing housing 22, through holes in one spring foil element 42, through holes in one fluid foil element 40, traverse the bore of the thrust bearing spacer 32, through holes in the opposite side fluid foil element 40, the holes in the opposite side spring foil member 42 and into holes 38 in the bearing thrust plate 28. The bearing thrust plate 28 is biased towards the center bearing housing 22 by a Belleville washer 23 disposed between the lip 25 on the bearing thrust plate 28 and the compressor housing 30.

The thickness of the thrust bearing spacer 32 is several thousandths of an inch greater than the thickness of the bearing rotor thrust disk 24. Variations in the foil or foil coating thicknesses inherently cause compensating variations in the spacing between the thrust plate 28 and the housing 22. Thus, variations in bearing sway space and bearing compliance due to foil thickness tolerances are prevented.

FIGS. 3–5 illustrate integrally formed fluid foil members 40, 40' and 40", respectively, each formed from a single flat disk termed a foil blank. The individual fluid foils 41, 41' and 41" (shown for purposes of illustration as ten) are each an arcuate segment formed by an outer circumferential slot 45, 45', or 45", an inner circumferential slot 47, 47', or 47", and a transverse slot 49, 49', or 49". The individual fluid foils 41, 41', and 41" are thus disposed between an inner ring 50, 50', or 50" and an outer ring 52, 52', 52" connected to an outer self shimming ring 54 by a plurality of support webs 55. Fluid passages or openings 56 (also shown as ten) are formed between adjacent support webs 55. The outer self-shimming ring 54 includes a plurality of indexing holes 60 for alignment of the fluid foil members 40, 40', 40" with the other components of the thrust bearing. Each aerodynamic foil 41, 41', and 41" has a trailing edge 62, 62', and 62", respectively.

As illustrated in FIG. 3, the individual foils 41 are formed between inner circumferential slot 47, radial transverse slot 49 and outer circumferential slot 45 so as to have a radial trailing edge 62. The slots 45, 47, and 49 would normally have a width approximately the same as the thickness of the foil blank.

The individual foils 41' illustrated in FIG. 4 are generally similar to the foils 41 illustrated in FIG. 3 except that the transverse slots 49' do not extend radially. The inner circumferential slots 47' are shorter than the inner circumferential slots 47 while the outer circumferential slots 45' are longer than outer circumferential slot 45. Thus, the trailing edge 62' of individual foils 41' is not radial but is disposed at an angle "x" from the radial. This angle "x" may be up to ten (10) degrees to provide a non-uniform bearing load profile, with the higher load capacity at the outer diameter of the individual foil 41' than at the inner diameter.

The individual foils 41" of FIG. 5 are somewhat of a cross of the features of the individual foils 41 of FIG. 3 and the foils 41' of FIG. 4. The transverse slots 49" are tapered from about five to ten thousandths of an inch at the outer diameter to a maximum of about one hundred thousandths of an inch at the inner diameter. This produces a slot 49" which decreases in width from the inner diameter to the outer diameter.

As illustrated in FIG. 5, the edge of the slot 49" at the trailing edge 62" of the individual foils 41" is generally radial while the opposite edge of the transverse slot 49" is at an angle "y" from the radial; with the angle "y" being generally on the same order as angle "x" from FIG. 4. This produces individual foils 41" with a reduced annular length at the inner diameter and as a result more pressure load capacity at the outer diameter. In addition, with the increased width of the slots 49" at the inner diameter, more cooling air is permitted to enter between the individual foils 41"

The slots in the foil blank can be produced by conventional EDM techniques to provide the biggest foil area. EDM techniques will, however, leave the individual foils flat and unshaped. The individual foils can be shaped or contoured by a separate forming step or left flat so that they will be shaped during bearing operation by an underspring. Alternately, the slots may be formed by a fine blanking or stamping technique which will form or contour the individual foils at the same time as the slots are produced.

Regardless of whether or not the individual foils are shaped or not, a conventional underspring would normally be utilized to pre-load and/or shape the individual foils. FIGS. 6–8 are an illustration of the cooperation between the foils 41 and the undersprings 72 to impart a shape or contour to the foils 41 during operation. The undersprings 72 include a plurality of corrugations which serve to displace and shape the individual foils 41.

While described with respect to the compliant foil member 40 of FIG. 3, it should be recognized that the undersprings are equally applicable to the compliant foil members 40' and 40' of FIGS. 4 and 5, respectively. In each of FIGS. 3, 4, and 5, a corresponding corrugated underspring 72, 72', and 72" is illustrated in phantom under one of the individual foils 41, 41', and 41" respectively.

The present invention improves the performance of a single, multi-foil, bearing member while maintaining the cost and manufacturing advantages of a single piece construction. Since the trailing edge and sides of the individual foils are not in physical contact with the compliant foil member, the individual foils are free to move axially, radially, and rotationally independently of each other. If one individual foil becomes thermally distressed, it will not detrimentally affect the other individual foils. These thermally independent foils can prevent premature bearing failure and undesirable deformations.

While specific embodiments of the invention have been illustrated and described, it is to be understood that these are provided by way of example only and that the invention is not to be construed as being limited thereto but only by the proper scope of the following claims.

What we claim is:

1. A compliant foil member for a fluid film thrust bearing, comprising:
   a thin flat disk;
   a plurality of inner circumferential slots in said thin flat disk, each of said plurality of inner circumferential slots having a leading edge and a trailing edge;
   a like plurality of outer circumferential slots in said thin flat disk, each of said plurality of outer circumferential slots having a leading edge and a trailing edge;
   a like plurality of transverse slots in said thin flat disk, each of said plurality of transverse slots extending between the trailing edge of an inner circumferential slot and the trailing edge of a corresponding outer circumferential slot to form a plurality of integral compliant foils on said thin flat disk.

2. The compliant foil member of claim 1 wherein said plurality of transverse slots is radial.

3. The compliant foil member of claim 1 wherein said plurality of transverse slots is displaced at a slight angle from radial.

4. The compliant foil member of claim 1 wherein said angle is a positive value up to ten degrees.

5. The compliant foil member of claim 1 wherein said plurality of transverse slots are tapered having a greater width at the trailing edge of said inner circumferential slot than at the trailing edge of said outer circumferential slot.

6. The compliant foil member of claim 5 wherein said plurality of tapered transverse slots has a radial edge.

7. A compliant foil fluid film thrust bearing comprising:
   a non-rotating thrust bearing surface;
   a thrust disk rotatably supported by said non-rotating thrust bearing surface; and
   a compliant foil bearing operably disposed between said rotatable thrust disk and said non-rotating thrust bearing surface and mounted on said thrust bearing surface, said compliant foil bearing comprising a thin flat disk, a plurality of inner circumferential slots in said thin flat disk with each of said plurality of inner circumferential slots having a leading edge and a trailing edge, a like plurality of outer circumferential slots in said thin flat disk with each of said plurality of outer circumferential slots having a leading edge and a trailing edge, a like plurality of transverse slots in said thin flat disk with each of said plurality of transverse slots extending between the trailing edge of an inner circumferential slot and the trailing edge of a corresponding outer circumferential slot to form a plurality of integral compliant foils on said thin flat disk, and a spring foil member mounted on said thrust bearing surface and disposed between said thrust bearing surface and said thin flat disk to configure said plurality of integral compliant foils on said thin flat disk.

8. The compliant foil fluid film thrust bearing of claim 7 wherein said plurality of transverse slots is radial.

9. The compliant foil fluid film thrust bearing of claim 7 wherein said plurality of transverse slots is displaced at a slight angle from radial.

10. The compliant foil fluid film thrust bearing of claim 9 wherein said angle is a positive value up to ten degrees.

11. The compliant foil fluid film thrust bearing of claim 7 wherein said plurality of transverse slots are tapered having a greater width at the trailing edge of said inner circumferential slot than at the trailing edge of said outer circumferential slot.

12. The compliant foil fluid film thrust bearing of claim 11 wherein said plurality of tapered transverse slots has a radial edge.

13. A compliant foil fluid film thrust bearing comprising:
   a bearing housing having a thrust bearing surface and a generally opposed thrust bearing plate;
   a shaft rotatably supported within said bearing housing and including a thrust disk radially extending between said thrust bearing surface and said opposed thrust bearing plate;
   a pair of annular compliant fluid foil members with one of said pair of members disposed on either side of said thrust disk,
   each of said pair of annular compliant fluid foil members comprising a thin flat disk, a plurality of inner circumferential slots in said thin flat disk with each of said plurality of inner circumferential slots having a leading edge and a trailing edge, a like plurality of outer circumferential slots in said thin flat disk with each of said plurality of outer circumferential slots having a leading edge and a trailing edge, a like plurality of transverse slots in said thin flat disk with each of said plurality of transverse slots extending between the trailing edge of an inner circumferential slot and the trailing edge of a corresponding outer circumferential slot to form a plurality of integral compliant foils on said thin flat disk; and
   a pair of annular spring foil members with one of said pair of members disposed between an annular compliant fluid foil member and said thrust bearing surface and the other of said pair of annular spring foil members disposed between said other of said pair of annular compliant fluid foil members and said thrust bearing plate and each of said annular spring foil members including means to configure said plurality of integral compliant foils on said thin flat. disk.

14. The compliant foil fluid film thrust bearing of claim 13 wherein said plurality of transverse slots is radial.

15. The compliant foil fluid film thrust bearing of claim 13 wherein said plurality of transverse slots is displaced at a slight angle from radial.

16. The compliant foil fluid film thrust bearing of claim 15 wherein said angle is a positive value up to ten degrees.

17. The compliant foil fluid film thrust bearing of claim 13 wherein said plurality of transverse slots are tapered having a greater width at the trailing edge of said inner circumferential slot than at the trailing edge of said outer circumferential slot.

18. The compliant foil fluid film thrust bearing of claim 17 wherein said plurality of tapered transverse slots has a radial edge.

* * * * *